US008667528B2

(12) United States Patent
Yu et al.

(10) Patent No.: US 8,667,528 B2
(45) Date of Patent: Mar. 4, 2014

(54) BROADCAST AUGMENTED REALITY ADVERTISEMENT SERVICE SYSTEM AND METHOD BASED ON MEDIA ID MATCHING

(75) Inventors: Hong Yeon Yu, Gwangju (KR); Nao Woo Kim, Gwangju (KR); Byung-Tak Lee, Gyeonggi-do (KR); Il Kyun Park, Daejeon (KR); Jai Sang Koh, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/334,923

(22) Filed: Dec. 22, 2011

(65) Prior Publication Data

US 2012/0167135 A1 Jun. 28, 2012

(30) Foreign Application Priority Data

Dec. 23, 2010 (KR) .......................... 10-2010-0133047

(51) Int. Cl.
*H04N 7/10* (2006.01)
*H04N 7/025* (2006.01)
*G06Q 30/00* (2012.01)

(52) U.S. Cl.
USPC .................. 725/34; 725/32; 725/35; 725/36; 725/62; 705/14.4; 705/14.43; 705/14.49; 705/14.53; 705/14.54; 705/14.55; 705/14.66; 705/14.67; 705/14.72

(58) Field of Classification Search
USPC ........ 725/32, 34, 35, 36, 62; 705/14.4, 14.43, 705/14.49, 15.53, 14.54, 14.55, 14.66, 705/14.67, 14.72
See application file for complete search history.

(56) References Cited

U.S. PATENT DOCUMENTS

| 6,795,821 | B2 * | 9/2004 | Yu ......................................... 1/1 |
| 7,917,927 | B1 * | 3/2011 | Morrison et al. ............... 725/43 |
| 7,987,491 | B2 * | 7/2011 | Reisman ....................... 725/112 |
| 2003/0014754 | A1 * | 1/2003 | Chang ............................ 725/60 |

(Continued)

FOREIGN PATENT DOCUMENTS

| JP | 2003-242072 | 8/2003 |
| KR | 10-2009-0044221 | 5/2009 |

(Continued)

OTHER PUBLICATIONS

Japanese Office Action mailed Jan. 18, 2013 for corresponding Japanese Application No. 2011-253948.

*Primary Examiner* — Hoang-Vu A Nguyen-Ba
(74) *Attorney, Agent, or Firm* — H.C. Park & Associates, PLC (57) ABSTRACT

Disclosed is a broadcast advertisement service system based on media ID matching, including: a broadcast-contents receiving terminal for receiving broadcast contents from a broadcasting system for a TV broadcaster and displaying the broadcast contents; a server for an AR advertisement broadcaster for receiving the broadcast contents from the broadcasting system for the TV broadcaster, generating a first media ID lookup table from the broadcast contents, and searching for AR advertisement data linked with on-air broadcast contents by referring to the first media ID lookup table; and a user terminal for acquiring the on-air broadcast contents in real time from the broadcast-contents receiving terminal, generating a second media ID lookup table from the acquired on-air broadcast contents, receiving the AR advertisement data linked with the on-air broadcast contents from the server for the AR advertisement broadcaster, and mixing and displaying the acquired on-air broadcast contents and the received AR advertisement data in real time.

13 Claims, 5 Drawing Sheets

(56) References Cited

U.S. PATENT DOCUMENTS

| | | |
|---|---|---|
| 2003/0055822 A1* | 3/2003 | Yu .................................. 707/6 |
| 2007/0089127 A1* | 4/2007 | Flickinger et al. ............. 725/32 |
| 2009/0094106 A1* | 4/2009 | Porter et al. .................. 705/14 |
| 2009/0125376 A1 | 5/2009 | Sundaresan et al. |
| 2009/0319365 A1* | 12/2009 | Waggoner et al. ......... 705/14.41 |
| 2011/0060611 A1* | 3/2011 | Metz et al. .................... 705/7 |

FOREIGN PATENT DOCUMENTS

| | | | | |
|---|---|---|---|---|
| KR | 10-2009-00447 02 | * | 6/2010 | ............ G06Q 30/00 |
| KR | 10-2009-0044702 | | 6/2010 | |
| KR | 10-2010-0076023 | | 7/2010 | |

\* cited by examiner

ID MATCHING

CROSS-REFERENCE TO RELATED APPLICATIONS

This application is based on and claims priority from Korean Patent Application No. 10-2010-133047, filed on Dec. 23, 2010, with the Korean Intellectual Property Office, the disclosure of which is incorporated herein in its entirety by reference.

TECHNICAL FIELD

The present disclosure relates to an advertisement service system and method for providing an advertisement through augmented reality, and more particularly, to a broadcast augmented reality advertisement service system and method based on media ID matching that provides a customized interactive broadcast advertisement service linked with on-air broadcast contents in augmented reality to a mobile terminal for a user in real time through media ID matching on the on-air broadcast contents.

BACKGROUND

Augmented reality (hereinafter, also referred to as AR) is a field of virtual reality, and is a computer graphic technology which combines virtual objects with a real-world environment such that the virtual objects look like physically existing objects in the real environment. The augmented reality has a feature capable of combining virtual objects with the real environment to augment and provide additional information hard to get only from the real world, unlike existing virtual reality aiming only at virtual spaces and objects.

That is, since the virtual reality technology generally makes users interested in the virtual environment, the users cannot see the real environment, whereas the augmented reality technology enables users to see the real environment and has a mixture form of the real environment and virtual objects. In other words, the virtual reality is seen to the users as a substitute for the real environment, whereas the augmented reality in which virtual objects are superimposed on the real world to augment the real word shows the users the augmented real word, thereby providing a better sense of reality to the users, as compared to the virtual reality.

This feature enables the augmented reality technology to be applied to various real environments unlike the existing virtual reality restrictively applicable only to fields such as games, and the augmented reality technology is in the spotlight as a next-generation display technology particularly appropriate for ubiquitous environments. Meanwhile, recently, various technologies for providing advertisements using the augmented reality have been developed.

Figure 1:
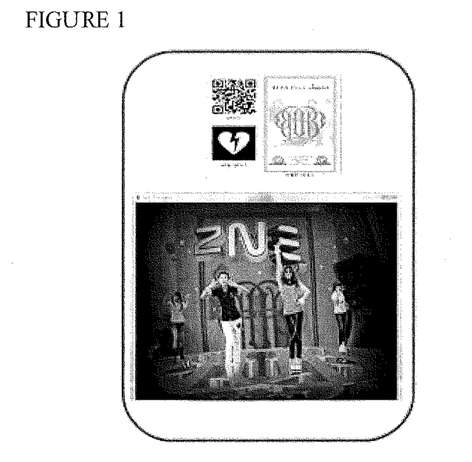
FIG. 1 is a view illustrating an advertisement based on a printed marker according to the related art.
Figure 2:
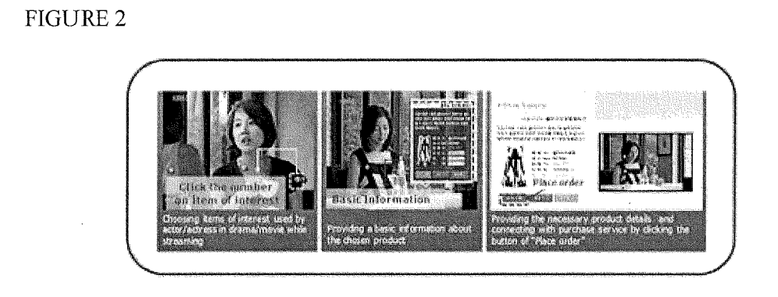
FIG. 2 is a view illustrating an interactive advertisement according to the related art.
Figure 3:
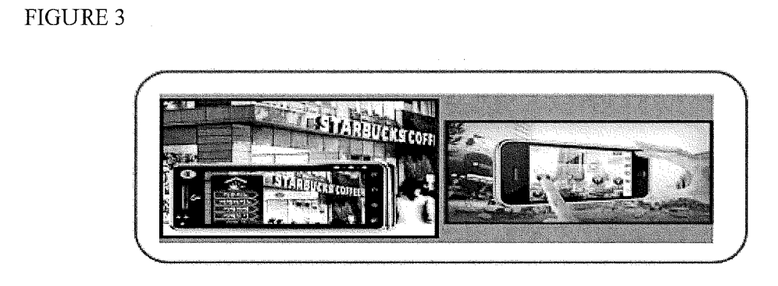
FIG. 3 is a view illustrating an advertisement using augmented reality according to the related art.

FIGS. 1 to 3 are views illustrating advertisement methods according to the related art.

FIG. 1 shows a method that provides advertisements mapped with specific markers (for example, QR codes) by inserting the markers into various print matters and identifying the markers through smart phones or the like.

FIG. 2 shows an interactive advertisement method that provides an advertisement for a specific item or product on an on-air screen or performs switch to a page for purchase if the corresponding item or product is selected.

FIG. 3 shows a method of implementing augmented reality from which it is possible to check streets and contents within a 1-km radius desired by a user if a marked position on a camera is clicked.

However, the methods of providing customized interactive advertisement services in user terminals according to the related art have the following three problems.

First, the user-customized interactive advertisement service essentially requires a broadcast-contents reediting process such as keyword definition on an object appearing in broadcast contents for inserting interactive advertisement information, and has a copyright problem according to reuse of contents. Also, in the user-customized interactive advertisement service, in order for users to request advertisement information of desired objects, the assistance of the users such as mouse dragging is required.

Second, since advertisement services using the AR require AR recognition markers, such as print matters, logos, and images, making it possible to recognize and analyze geometrical feature information of products, advertisement information provision environments are restrictive. In order to provide detailed information according to user's requests, a large-capacity database for storing, analyzing, and comparing feature information of various products is required.

Third, services in which an advertisement field is defined in a user application of a mobile terminal in advance, and advertisements are provided and maintained at a predetermined position when the application is being executed cannot provide efficient advertisement services due to a limit in the screen size of the mobile terminal. Also, it is difficult to provide advertisement services linked with on-air broadcast contents to the users in real time.

Therefore, development of a method capable of solving the disadvantages and providing efficient advertisements on the air is urgently needed.

SUMMARY

The present disclosure has been made in an effort to provide broadcast AR advertisement service system and method based on media ID matching which provide customized interactive broadcast AR advertisements linked with on-air broadcast contents to a mobile terminal for a user in real time by identifying a media ID of the on-air broadcast contents between an AR advertisement provider server and the mobile terminal for the user in real time.

The present disclosure has been made in an effort to provide broadcast AR advertisement service system and method based on media ID matching which can prevent copyright issues according to reediting by generating independent AR advertisement broadcast information corresponding to on-air broadcast contents in a short time without a process of reediting the broadcast contents.

The present disclosure has been made in an effort to provide broadcast AR advertisement service system and method based on media ID matching which can reduce the cost for generating AR recognition markers for recognizing specific products, maximize advertisement effects without being subjected to a limit in the screen size, and provide broadcast AR advertisement services linked with on-air broadcast contents to a mobile terminal for a user in real time.

An exemplary embodiment of the present disclosure provides a broadcast advertisement service system based on media ID matching, including: a broadcast-contents receiving terminal for receiving broadcast contents from a broadcasting system for a TV broadcaster and displaying the broadcast contents; a server for an AR advertisement broadcaster for receiving the broadcast contents from the broadcasting system for the TV broadcaster, generating a first media ID lookup table from the broadcast contents, and searching for advertisement data linked with on-air broadcast contents by referring to the first media ID lookup table; and a user terminal for acquiring the on-air broadcast contents in real time from the broadcast-contents receiving terminal, generating a second media ID lookup table from the acquired on-air broadcast contents, receiving the AR advertisement data linked with the on-air broadcast contents from the server for the AR advertisement broadcaster, and mixing and displaying the acquired on-air broadcast contents and the received AR advertisement data in augmented reality in real time.

Another exemplary embodiment of the present disclosure provides a server for the AR advertisement broadcaster, including: a media ID generating/matching unit for receiving broadcast contents from a broadcasting system for a TV broadcaster, generating a first media ID lookup table, and comparing and analyzing the first media ID lookup table and a second media ID lookup table received from a user terminal so as to identify a channel for the broadcast contents and on-air broadcast contents of the broadcast contents; and an advertisement unit for determining existence or non-existence of AR advertisement data linked with the on-air broadcast contents of the identified channel, transmitting the determination result to the user terminal, and transmitting the AR advertisement data and additional information to the user terminal in response to an advertisement data request from the user terminal.

Yet another exemplary embodiment of the present disclosure provides a user terminal including: a broadcast-contents acquiring unit for acquiring on-air broadcast contents of broadcast contents from a broadcast-contents receiving terminal receiving and displaying the broadcast contents; a media ID generating/matching unit for generating a second media ID lookup table from the acquired on-air broadcast contents, and comparing and analyzing a first media ID lookup table received from a server for an AR advertisement broadcaster and the second media ID lookup table so as to identify a channel for the broadcast contents and the on-air broadcast contents; and an AR advertisement data mixing unit for receiving AR advertisement data linked with the on-current broadcast contents and additional information from the server for the AR advertisement broadcaster, and mixing and displaying the acquired on-air broadcast contents and the received AR advertisement data.

Still another exemplary embodiment of the present disclosure provides an AR advertisement service method in a server for an AR advertisement broadcaster, including: receiving broadcast contents from a broadcasting system for a TV broadcaster, and generating a first media ID lookup table; comparing and analyzing the first media ID lookup table and a second media ID lookup table received from a user terminal so as to identify a channel for the broadcast contents and on-air broadcast contents of the broadcast contents; determining existence or non-existence of AR advertisement data linked with the on-air broadcast contents of the identified channel, and transmitting the determination result to the user terminal; and if receiving an advertisement data request from the user terminal, transmitting the AR advertisement data and additional information to the user terminal.

Still yet another exemplary embodiment of the present disclosure provides an AR advertisement service method in a user terminal, including: acquiring on-air broadcast contents of broadcast contents from a broadcast-contents receiving terminal; generating a second media ID lookup table from the acquired on-air broadcast contents, and comparing and analyzing a first media ID lookup table received from a server for an AR advertisement broadcaster and the second media ID lookup table so as to identify a channel for the broadcast contents and the on-air broadcast contents; and receiving AR advertisement data linked with the on-air broadcast contents and additional information from the server for the AR advertisement broadcaster, and mixing and displaying the acquired on-air broadcast contents and the received AR advertisement data.

According to the exemplary embodiments of the present disclosure, it is possible to provide customized interactive broadcast AR advertisements linked with on-air broadcast contents to a mobile terminal for a user in real time by identifying a media ID of the on-air broadcast contents between a server for an AR advertisement broadcaster and the mobile terminal for the user in real time.

According to the exemplary embodiments of the present disclosure, it is possible to prevent copyright issues according to reediting by generating AR advertisement broadcast information corresponding to on-air broadcast contents in a short time without a process of reediting the broadcast contents.

According to the exemplary embodiments of the present disclosure, it is possible to reduce the cost for generating AR recognition markers for recognizing specific products, and to maximize advertisement effects without a limit in the screen size.

According to the exemplary embodiments of the present disclosure, it is possible to provide on-air broadcast contents together with AR advertisements linked with the on-air broadcast contents in real time such that users are more interested in (focus more on) the advertisements, thereby maximizing the advertisement effects. Moreover, since independent AR advertisements are transmitted to the mobile terminal for the user without changing the broadcast contents that the user is watching, it is possible to remove dependency of advertisement broadcasters on broadcast service providers, and to contribute to invigorating the related composite service industry.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Exemplary embodiments of the present disclosure provides a system and method that provide customized interactive broadcast AR advertisements linked with on-air broadcast contents in a mobile terminal for a user through identification of a media ID of the on-air broadcast contents between an AR advertisement broadcaster and the mobile terminal for the user. Therefore, according to the exemplary embodiments of the present disclosure, it is not required to reedit the broadcast contents for providing interactive advertisements, and specific AR recognition markers such as printed matters and logos for providing AR advertisement information services are not required.

Since it is unnecessary to reedit existing broadcast contents, it is possible to protect the copyrights of the broadcast contents, and since the on-air broadcast contents and AR advertisements are mixed and provided, it is possible to make the users more interested in (focus more on) the advertisements, thereby maximizing the advertisement effects. Since independent AR advertisements are transmitted to the mobile terminal for the user without changing the broadcast contents that the user is watching, it is possible to remove dependency of advertisement broadcasters on broadcast service providers, and to contribute to invigorating the related composite service industry.

Figure 4:
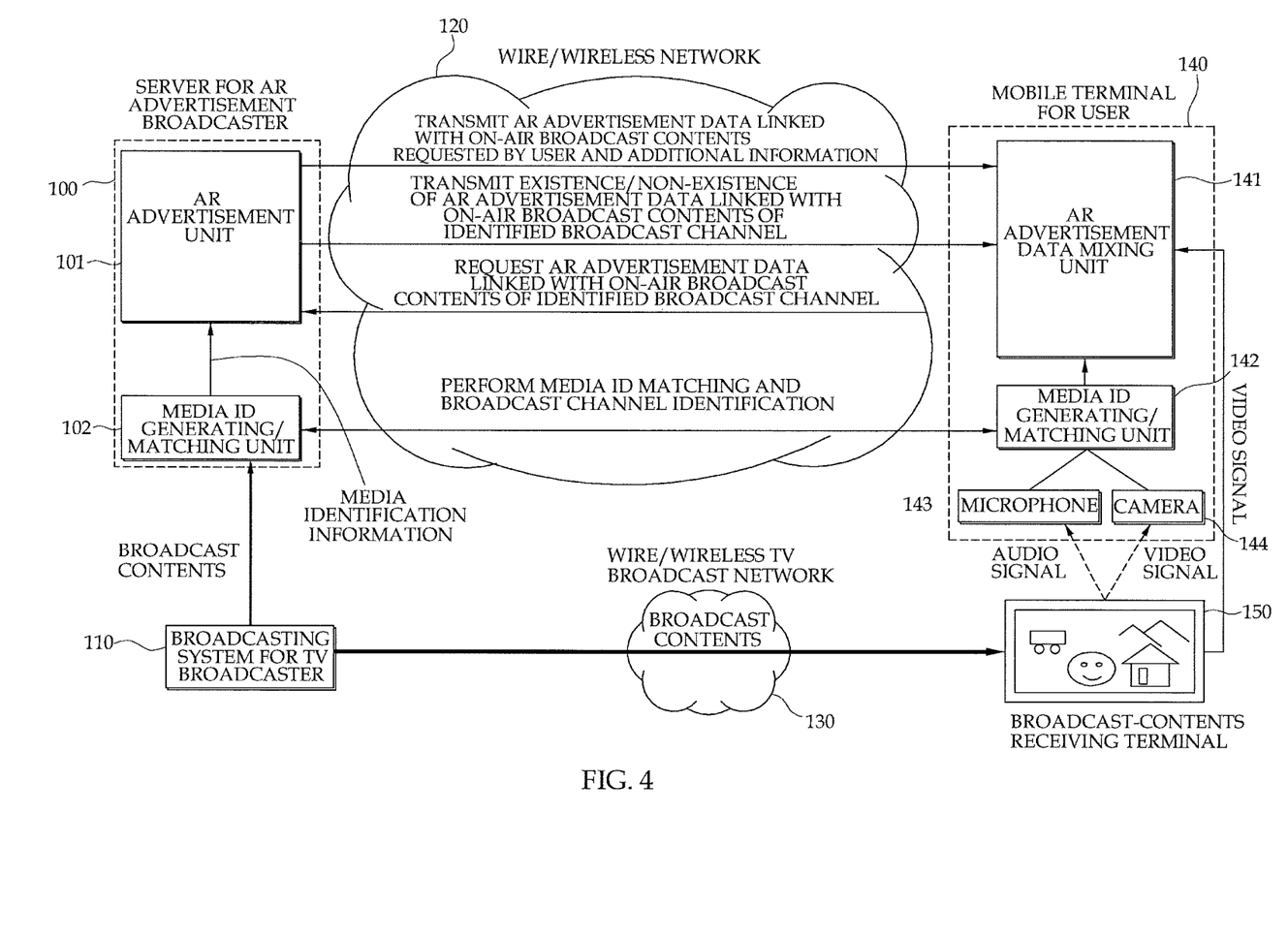
FIG. 4 is a view illustrating an advertisement service system according to an exemplary embodiment of the present disclosure.

FIG. 4 is a view illustrating an advertisement service system according to an exemplary embodiment of the present disclosure.

Referring to FIG. 4, a system for providing broadcast AR advertisements on the basis of media ID matching according to an exemplary embodiment of the present disclosure includes a broadcasting system 110 for a TV (such as public TV, cable TV, and IPTV) broadcaster that provides broadcast contents, a broad-contents receiving terminal 150 that receives the broad contents from the broadcasting system 110 for the TV broadcaster, a server 100 for an AR advertisement broadcaster that provides broadcast AR advertisements appropriate for on-air broadcast contents, and a mobile terminal 140 for a user that mixes the on-air broadcast contents and advertisement information linked with the on-air broadcast contents in augmented reality, and provides the augmented reality.

The broadcasting system 110 for the TV broadcaster provides the broadcast contents to the server 100 for the AR advertisement broadcaster and the general broadcast-contents receiving terminal 150 (such as a digital TV and an analog TV) through a wire/wireless TV broadcast network 130.

In this case, in the server 100 for the AR advertisement broadcaster, a media ID generating/matching unit 102 generates a lookup table (which is a list for comparison, and hereinafter, is referred to as a first media ID lookup table) on the basis of audio and video signals of the broadcast contents of the broadcasting system 110 for the TV broadcaster. At the same with this, the mobile terminal 140 for the user acquires audio and video signals of on-air broadcast contents on the broadcast-contents receiving terminal 150 through a microphone 143 and a camera 144 of the mobile terminal 140 for the user in real time, and generates a media ID lookup table (hereinafter, referred to as a second media ID lookup table) in a media ID generating/matching unit 142.

If the media ID lookup tables are generated as described above, the server 100 for the AR advertisement broadcaster and the mobile terminal 140 for the user identify a channel for the broadcast contents, on-air broadcast contents of the broadcast contents, and the like by comparing and analyzing the first and second media ID lookup tables. Also, the server 100 for the AR advertisement broadcaster determines whether there are broadcast AR advertisement data corresponding to the identified on-air broadcast contents by searching advertisement contents information database 103, and transmits the determination result to the mobile terminal 140 for the user.

In this case, if the corresponding broadcast AR advertisement data exist, the mobile terminal 140 for the user displays existence of the broadcast AR advertisement data in various forms such as an icon or a speech bubble on the screen of the mobile terminal 140 for the user, and the user selects the icon or speech through various input means of the mobile terminal 140 for the user, so as to request the corresponding AR advertisement data from the server 100 for the AR advertisement broadcaster. In response of this request, the server 100 for the AR advertisement broadcaster transmits the corresponding AR advertisement data and additional information to the mobile terminal 140 for the user.

A data mixing unit 141 of the mobile terminal 140 for the user mixes and displays the video signal acquired in real time from the broadcast-contents receiving terminal 150 and the AR advertisement linked with the video signal in augmented reality.

Figure 5:
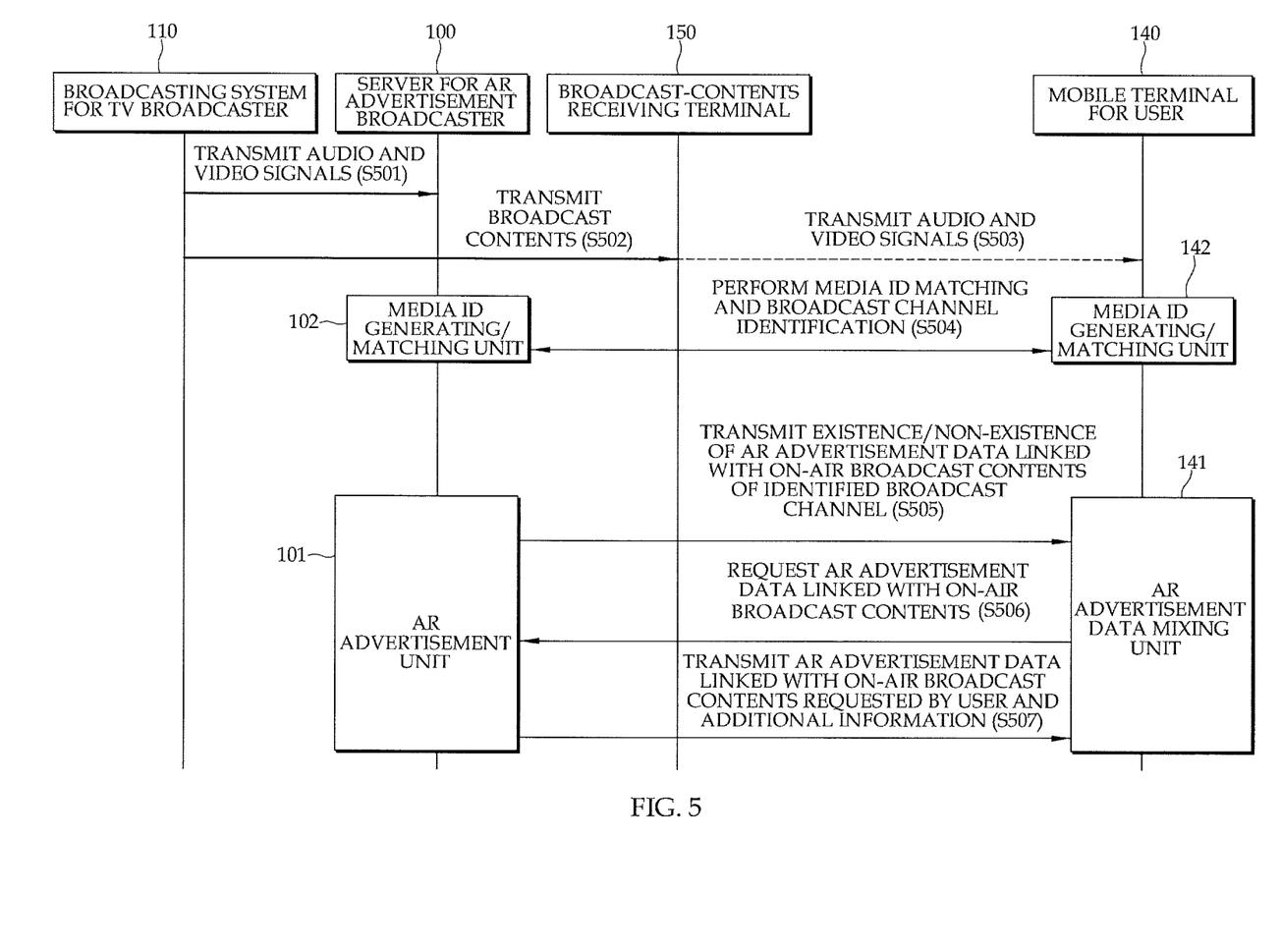
FIG. 5 is a signal flow chart illustrating an advertisement service providing procedure according to an exemplary embodiment of the present disclosure.

FIG. 5 is a signal flow chart illustrating an advertisement service providing procedure according to an exemplary embodiment of the present disclosure.

Referring to FIG. 5, the broadcasting system 110 for the TV broadcaster provides the broadcast contents composed of the audio and video signals to the server 100 for the AR advertisement broadcaster and the broadcast-contents receiving terminal 150 in steps S501 and S502, respectively. In the mobile terminal 140 for the user, the broadcast-contents receiving terminal 150 acquires the on-air broadcast contents on the broadcast-contents receiving terminal 150 through the microphone 143 and the camera 144 in real-time in step S503.

The server 100 for the AR advertisement broadcaster and the mobile terminal 140 for the user generate the first and second media ID lookup tables regarding the corresponding broadcast contents by the media ID generating/matching units 102 and 142, respectively.

If the media ID lookup tables are generated by the media ID generating/matching units 102 and 142 as described above, the server 100 for the AR advertisement broadcaster and the mobile terminal 140 for the user identify the channel for the broadcast contents and the on-air broadcast contents of the broadcast contents by comparing and analyzing the first and second media ID lookup tables in step S504.

An AR advertisement unit 101 of the server 100 for the AR advertisement broadcaster searches the advertisement contents information database 130 so as to determine whether there are AR advertisement data corresponding to the on-air broadcast contents of the identified broadcast channel, and transmits the determination result to the mobile terminal 140 for the user in step S505. In this case, if the corresponding AR advertisement information data exist, the AR advertisement data mixing unit 141 of the mobile terminal 140 for the user requests the corresponding AR advertisement linked with the on-air broadcast contents of the identified broadcast channel from the server 100 for the AR advertisement broadcaster in step S506. In response to this request, the server 100 for the AR advertisement broadcaster transmits the corresponding AR advertisement data and the additional information to the mobile terminal 140 for the user.

Finally, the AR advertisement data mixing unit 141 of the mobile terminal 140 for the user mixes and displays the video signal of the broadcast contents acquired in real time from the broadcast-contents receiving terminal 150 and the linked AR advertisements in augmented reality.

Hereinafter, process procedures in the mobile terminal for the user and the server for the AR advertisement broadcaster will be described in detail with reference to FIGS. 6 and 7.

Figure 6:
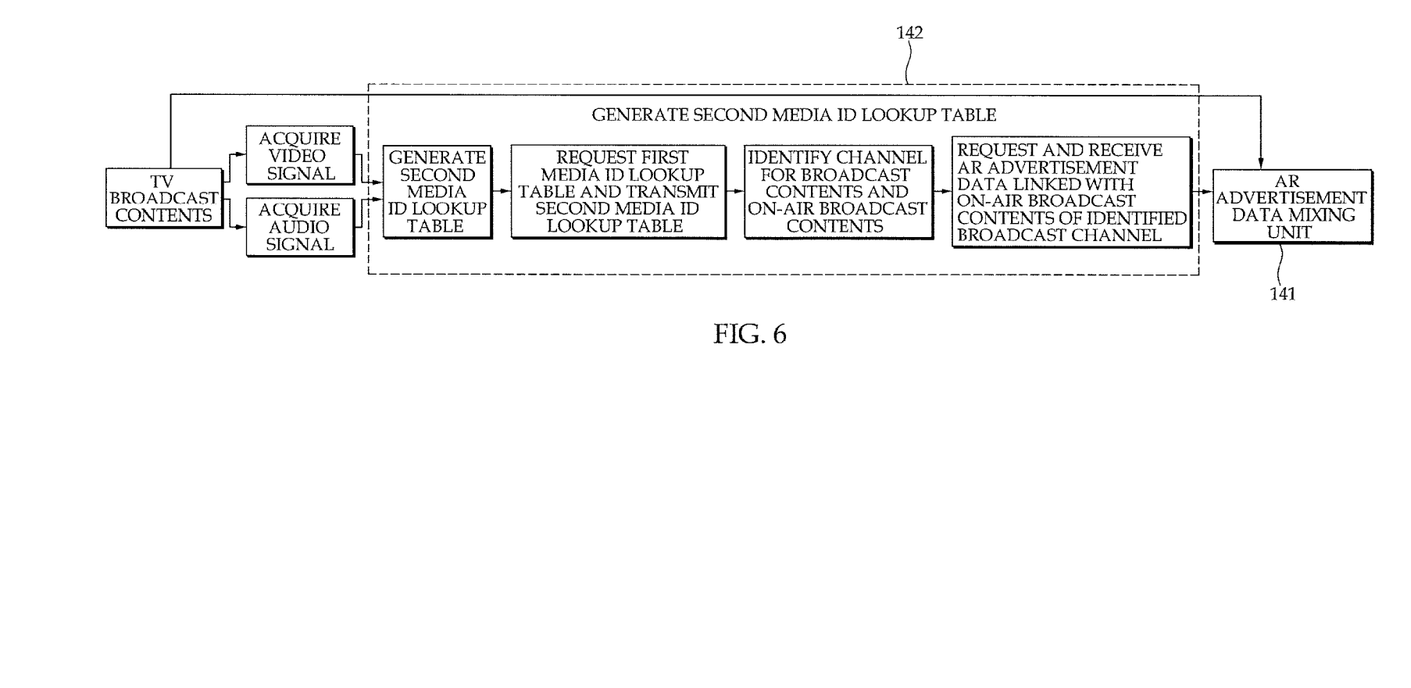
FIG. 6 is a view illustrating a service providing procedure in a mobile terminal for a user according to an exemplary embodiment of the present disclosure.

FIG. 6 is a view illustrating a service providing procedure in the mobile terminal for the user according to the exemplary embodiment of the present disclosure.

Referring to FIG. 6, the mobile terminal 140 for the user acquires the on-air broadcast contents in real time from the broadcast-contents receiving terminal 150 through the microphone and the camera of the mobile terminal for the user.

The media ID generating/matching unit 142 generates the second media ID lookup table from the audio and video signals of the acquired on-air broadcast contents.

Then, the media ID generating/matching unit 142 requests the first media ID lookup table from the server 100 for the AR advertisement broadcaster. In this case, the media ID generating/matching unit 142 transmits the second media ID lookup table to the server 100 for the AR advertisement broadcaster while requesting the first media ID lookup table.

Next, the media ID generating/matching unit 142 receives the first media ID lookup table from the server 100 for the AR advertisement broadcaster, and compares and analyzes the first and second media ID lookup tables so as to identify the channel for the broadcast contents and the on-air broadcast contents of the broadcast contents.

Next, the media ID generating/matching unit 142 requests the AR advertisement data linked with the on-air broadcast contents of the identified broadcast channel, from the server 100 for the AR advertisement broadcaster, and receives the AR advertisement data linked with the on-air broadcast contents and the additional information from the server 100 for the AR advertisement broadcaster.

The AR advertisement data mixing unit 141 of the mobile terminal 140 for the user mixes the AR advertisement data linked with the on-air broadcast contents received from the server 100 for the AR advertisement broadcaster with the on-air broadcast contents acquired in real time from the broadcast-contents receiving terminal 150 in augmented reality, and displays the augmented reality.

Figure 7:
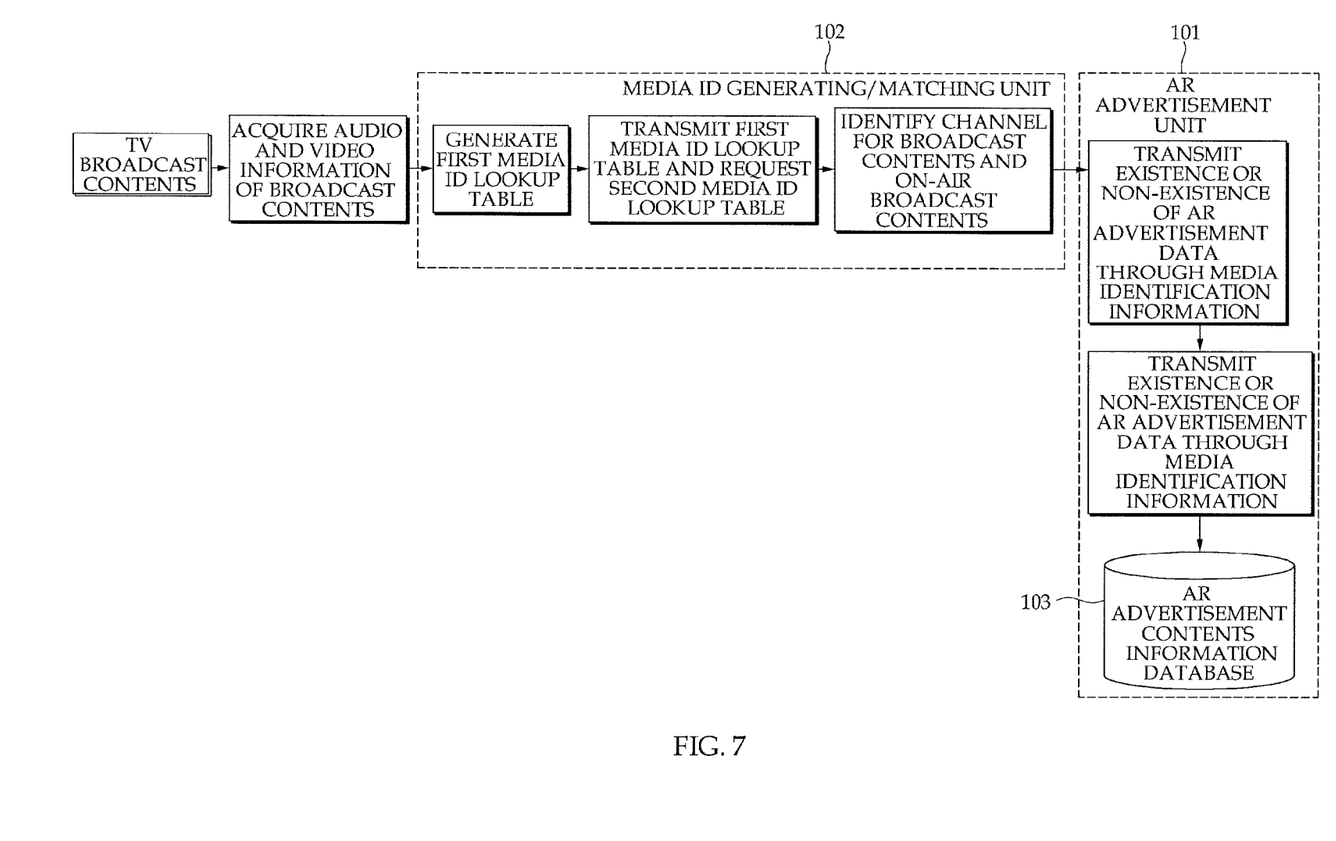
FIG. 7 is a view illustrating a process procedure in a server for broadcast AR advertisement broadcaster.

FIG. 7 is a view illustrating a process procedure in the server for the AR advertisement broadcaster.

Referring to FIG. 7, the server 100 for the AR advertisement broadcaster receives the audio and video information of the on-air broadcast contents in real time from broadcasting system 110 for the TV broadcaster, and the media ID generating/matching unit 102 generates the first media ID lookup table for identifying the channel for the broadcast contents and the on-air broadcast contents of the broadcast contents, and transmits the generated first media ID lookup table to the mobile terminal 140 for the user in response to the request of the mobile terminal 140 for the user.

In this case, the media ID generating/matching unit 102 compares and analyzes the second media ID lookup table received from the mobile terminal 140 for the user and the first media ID lookup table, and transmits media identification information to the AR advertisement unit 101.

The AR advertisement unit 101 checks existence or non-existence of the corresponding AR advertisement data in the AR advertisement contents information database 103 against the media identification information, and transmits the check result to the mobile terminal 140 for the user. The AR advertisement unit 101 transmits the AR advertisement data and the additional information to the mobile terminal 140 for the user in response to the AR advertisement data transmission request of the mobile terminal 140 for the user.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A server for an AR (augmented reality) advertisement broadcaster, comprising:
a media ID generating and matching unit for receiving broadcast contents from a broadcasting system for a TV broadcaster, generating a first media ID lookup table, and comparing and analyzing the first media ID lookup table and a second media ID lookup table received from a user terminal so as to identify a channel for the broadcast contents and on-air broadcast contents of the broadcast contents; and
an advertisement unit for determining existence or non-existence of AR advertisement data linked with the on-air broadcast contents of the identified channel, transmitting the determination result to the user terminal, and transmitting the AR advertisement data linked with the on-air broadcast contents and additional information to the user terminal in response to an advertisement data request from the user terminal.

2. The server for an AR advertisement broadcaster of claim 1, wherein while receiving the second media ID lookup table from the user terminal, the media ID generating and matching unit transmits the first media ID lookup table to the user terminal in response to a request for transmission of the first media ID lookup table.

3. A user terminal comprising:
a broadcast-contents acquiring unit for acquiring on-air broadcast contents of broadcast contents from broadcast-contents receiving terminal receiving and displaying the broadcast contents;
a media ID generating and matching unit for generating a second media ID lookup table from the acquired on-air broadcast contents, and comparing and analyzing a first media ID lookup table received from a server for an AR advertisement broadcaster and the second media ID lookup table so as to identify a channel for the broadcast contents and the on-air broadcast contents; and
an AR (augmented reality) advertisement data mixing unit for receiving AR advertisement data linked with the on-air broadcast contents and additional information from the server for the AR advertisement broadcaster, and mixing and displaying the acquired on-air broadcast contents and the received AR advertisement data.

4. The user terminal of claim 3, wherein the broadcast-contents acquiring unit includes a microphone and a camera, and acquires an audio signal and a video signal of the on-air broadcast contents through the microphone and the camera.

5. The user terminal of claim 3, wherein the media ID generating and matching unit requests transmission of the first media ID lookup table from the server for the AR advertisement broadcaster while transmitting the second media ID lookup table to the server for the AR advertisement broadcaster.

6. The user terminal of claim 3, wherein:
the AR advertisement data mixing unit receives existence or non-existence of the AR advertisement data linked with the on-air broadcast contents of the identified channel, from the server for the AR advertisement broadcaster, and requests transmission of the AR advertisement data from the server for the AR advertisement broadcaster in a case where the AR advertisement data linked with the on-air broadcast contents of the identified channel exist.

7. An AR (augmented reality) advertisement service method in a server for an AR advertisement broadcaster, comprising:

receiving broadcast contents from a broadcasting system for a TV broadcaster, and generating a first media ID lookup table;

comparing and analyzing the first media ID lookup table and a second media ID lookup table received from a user terminal so as to identify a channel for the broadcast contents and on-air broadcast contents of the broadcast contents;

determining existence or non-existence of AR advertisement data linked with the on-air broadcast contents of the identified channel, and transmitting the determination result; and if receiving an advertisement data request from the user terminal, transmitting the AR advertisement data and additional information to the user terminal.

8. The method of claim 7, further comprising receiving a request for transmission of the first media ID lookup table from the user terminal, and transmitting the first media ID lookup table to the user terminal.

9. An AR (augmented reality) advertisement service method in a user terminal, comprising:

acquiring on-air broadcast contents of broadcast contents from a broadcast-contents receiving terminal;

generating a second media ID lookup table from the acquired on-air broadcast contents;

comparing and analyzing a first media ID lookup table received from a server for an AR advertisement broadcaster and the second media ID lookup table so as to identify a channel for the broadcast contents and the on-air broadcast contents; and receiving AR advertisement data linked with the on-air broadcast contents and additional information from the server for the AR advertisement broadcaster, and mixing and displaying the acquired on-air broadcast contents and the received AR advertisement data.

10. The method of claim 9, wherein the acquiring of the broadcast-contents includes acquiring an audio signal and a video signal of the on-air broadcast contents through a microphone and a camera.

11. The method of claim 9, further comprising requesting transmission of the first media ID lookup table from the server for the AR advertisement broadcaster while transmitting the second media ID lookup table to the server for the AR advertisement broadcaster.

12. The method of claim 9, further comprising:

receiving existence or non-existence of the AR advertisement data linked with the on-air broadcast contents of the identified channel, from the server for the AR advertisement broadcaster, and requesting transmission of the AR advertisement data from the server for the AR advertisement broadcaster in a case where the AR advertisement data linked with the on-air broadcast contents of the channel identified exist.

13. The method of claim 12, wherein in the receiving of the existence or non-existence of the AR advertisement data, the existence of the AR advertisement data is displayed in a form such as an icon or a speech bubble on a screen of the user terminal.

* * * * *